United States Patent [19]

Nomiyama

[11] Patent Number: 5,787,421

[45] Date of Patent: Jul. 28, 1998

[54] SYSTEM AND METHOD FOR INFORMATION RETRIEVAL BY USING KEYWORDS ASSOCIATED WITH A GIVEN SET OF DATA ELEMENTS AND THE FREQUENCY OF EACH KEYWORD AS DETERMINED BY THE NUMBER OF DATA ELEMENTS ATTACHED TO EACH KEYWORD

[75] Inventor: Hiroshi Nomiyama, Kawasaki, Japan

[73] Assignee: International Business Machines Corporation, Armonk, N.Y.

[21] Appl. No.: 584,826

[22] Filed: Jan. 11, 1996

[30] Foreign Application Priority Data

Jan. 12, 1995 [JP] Japan .................................. 7-002955

[51] Int. Cl.$^6$ .................................................. G06F 17/30
[52] U.S. Cl. ...................... 707/5; 395/757; 707/7; 707/516; 707/529; 704/7
[58] Field of Search .......................... 395/605, 607, 395/616, 757, 778, 791; 707/7, 516, 729; 704/7

[56] References Cited

U.S. PATENT DOCUMENTS

| | | | |
|---|---|---|---|
| 4,817,036 | 3/1989 | Millett et al. | 364/900 |
| 4,958,284 | 9/1990 | Bishop et al. | 364/419 |
| 4,967,341 | 10/1990 | Yamamoto et al. | 364/200 |
| 4,972,349 | 11/1990 | Kleinberger | 364/900 |
| 5,020,019 | 5/1991 | Ogawa | 364/900 |
| 5,168,565 | 12/1992 | Morita | 395/600 |
| 5,263,159 | 11/1993 | Mitsui | 395/600 |
| 5,297,042 | 3/1994 | Morita | 364/419.19 |
| 5,375,235 | 12/1994 | Berry et al. | 395/600 |
| 5,404,514 | 4/1995 | Kageneck et al. | 395/605 |
| 5,523,945 | 6/1996 | Satoh et al. | 364/419.08 |
| 5,598,557 | 1/1997 | Doner et al. | 395/605 |
| 5,642,518 | 6/1997 | Kiyama et al. | 395/757 |

FOREIGN PATENT DOCUMENTS

| | | |
|---|---|---|
| 0 601 759 A1 | 6/1994 | European Pat. Off. . |
| PUPA 63-238622 | 3/1987 | Japan . |
| PUPA 3-65763 | 8/1989 | Japan . |
| PUPA 5-35798 | 7/1991 | Japan . |
| WO 92/04681 | 3/1992 | WIPO . |

OTHER PUBLICATIONS

"Information Filtering Based on User Behavior Analysis and Best Match Retrieval", M. Morita; Y. Shinoda, SIGIR '94, Dublin, *Proc. of Seventeenth Annual Int. ACM–SIGIR Conf on Research and Dev. in Information Retrieval*, 3 Jul. 1994, Croft W. B.; van Rigsbergen C. J. (Editors), pp. 272–281, Xp 000475327.

(List continued on next page.)

*Primary Examiner*—Thomas G. Black
*Assistant Examiner*—Jean R. Homere
*Attorney, Agent, or Firm*—Marilyn Smith Dawkins

[57] ABSTRACT

The system and method of this invention provides an approach for automatically indicating what property a current set of documents possesses, and an approach for retrieving a set of similar documents by specifying a document rather than a keyword. First, in a set of keywords attached to the set of documents narrowed in response to user retrieval processing, a system according to the present invention counts the number of documents to which each of the keywords is attached to and displays the keywords in order of decreasing frequency. Next, a user specifies the document(s) of interest among the set of documents. In response to this, out of the keywords attached to the documents specified by the user, a keyword is able to retrieve any documents other than the one(s) specified. From the set of keywords attached to the current set of document narrowed, this is determined by omitting the keywords meeting the following conditions: (1) the keyword is not attached to any documents other than the specified one; and (2) the keyword is attached to all the documents in the current set of documents. An automatic retrieval with this keyword will enable narrowing by document rather by the keyword.

37 Claims, 3 Drawing Sheets

OTHER PUBLICATIONS

"Compound Document Processing System." Al–Hawamdeh, S.; Loke, Christopher J. C. *Proc. of the Fifteenth International Computer Software and Applications Conference,* Tokyo, Sep. 1991, Knafl, G. J., pp. 640–644, Xp 000260575.

"And–less Retrieval: Toward Perfect Ranking", Chang, S. C.; Chen, W.C., *Proc ASIS Annual Meeting 1987,* Oct. 1987, pp. 30–35.

"Extended Boolean Retrieval", Salton, G.; Fox, E.A.; Wu, H., *Communications of the ACM,* Nov. 1983 vol. 28, No. 11., pp. 1022–1036.

"Fuzzy Requests: An Approach to Weighted Boolean Retrieval", Bookstein, A., *Journal ASIS,* Jul. 1980, vol. 31, No. 4, pp. 240–247.

"Towards a Friendly Adaptable Information Retrieval System", Chang, S–C; Chow, A., *Proc. RIAO 88,* Mar. 1988, pp. 172–182.

SYSTEM AND METHOD FOR INFORMATION RETRIEVAL BY USING KEYWORDS ASSOCIATED WITH A GIVEN SET OF DATA ELEMENTS AND THE FREQUENCY OF EACH KEYWORD AS DETERMINED BY THE NUMBER OF DATA ELEMENTS ATTACHED TO EACH KEYWORD

BACKGROUND OF THE INVENTION

1. Field of the Invention

The present invention refers to a retrieval technique for databases holding newspaper items, patent publications, or image information in such a manner as to be retrievable by using computers.

2. Description of the Related Art

Conventionally, databases holding newspaper items, patent publications, or image information in such a manner as to be retrievable by using computers have been generally used. In such systems, to make it easy for an operator to retrieve information, a plurality of keywords are attached for every individual element in the database (e.g., for individual articles in a newspaper or for every individual patent publication).

To perform a retrieval, generally, an interactive retrieval method called free keyword scheme is used. According to this, retrieved results are obtained with user's successive keyword inputs and consequently this method is advantageous for a skilled user in preparing a plurality of retrieval expressions and successively narrowing the extent until a desired number of items are obtained. Such retrieval expressions normally contain logical operations (AND, OR, NOT, and the like) for a plurality of conditions. However, this type of conventional scheme does not make it possible to predict what degree of effect was given by which condition. In other words, to check that no other literature is omitted than found, the difference in retrieval results between the attached case and the removed case for each of the conditions used in retrieval must be verified one by one, but even a slight increase in the complication of retrieval will so greatly increase the number of combinatorial cases with logical expressions that such methods cannot be applied in practice.

Furthermore, because most retrieval systems are designed on the assumption that "users are well acquainted with information to be searched in its neighboring fields", it is difficult for an unskilled user, unable to think of appropriate keywords, to narrow numerous retrieved literatures down to several appropriate literatures. Thus, such a system is required that enables a user to know a general tendency of literatures to be retrieved even if the user is insufficient in knowledge about a field to be retrieved. Further required is a system that presents a group of keywords effective for retrieval by an unskilled user unable to think of appropriate keywords, and which navigates even an unskilled user in such a manner as to be able to reach interesting items of information. Because of this, it becomes necessary to estimate the amount of information or the topicality given by keywords. In this connection, techniques described in the following publications are known.

PUPA 63-238622 discloses a keyword-specified information retrieval scheme comprising the steps of installing a means for storing related keywords previously having a relation to certain keywords, reading related keywords from the keyword storing means by specifying a keyword, and performing information retrieval by using the related keywords.

U.S. Pat. No. 5,168,565 (PUPA 2-1057) discloses a method comprising the steps of installing a means for extracting keywords from registered documents and an inverted file creation means for creating an inverted file indicating a relation between the keywords, further creating a keyword connection table for describing related information between the keywords, and selecting a document that meets the retrieval conditions from an inputted keyword by using the inverted file and the keyword connection table.

PUPA 3-65763 discloses a retrieval apparatus comprising a keyword extraction means for extracting keywords contained in a retrieval statement and a retrieval means for retrieving a retrieval target statement under consideration of the strength of relationship between a keyword extracted and the keywords contained in the retrieval target statement.

In retrieving data related to the currently displayed data, PUPA 5-35798 discloses a method comprising the steps of retrieving a database based on a logical OR of all keywords in the possession of the displayed data, if a plurality of candidates found, determining whether an index in the possession of these retrieved data is contained in elements of the keyword used for retrieval or not, and preferentially displaying data whose index is contained in elements of the keyword used for retrieval.

However, the prior arts mentioned above have disclosed no technique enabling one to glance over by what keyword the group of documents obtained from retrieval are inclusively characterized.

In addition, a method that is effective in deepening one's understanding about a field in which one is totally not specialized or with which one is unfamiliar, is known which comprises the repeated steps of reading a basic introduction to the relevant field or an elementary book, getting and looking through a reference or citation described in the end or introduction of the elementary book, and further referring to a literature cited in the reference or citation. If a method similar to this is substantiated in a database comprising a plurality of documents by computer processing, it is thought that this would help a user to retrieve a document in his/her unfamiliar field. However, the prior arts mentioned above, though giving a technique for narrowing targets of retrieval in accordance with a keyword, suggests no dynamic technique whatever for navigating from one document to another based on the relatedness.

SUMMARY OF THE INVENTION

It is, therefore, an object of the present invention to provide a method and system for automatically indicating the property of the currently narrowed set of documents in a document database.

It is another object of the present invention to provide a method and system for automatically indicating, to a user having no detailed knowledge about the contents of a document database, a keyword effective in further narrowing a selection.

In a set of keywords attached to the documents narrowed in response to a user's retrieval processing, the present inventive system first performs the processing of evaluating the number of documents to which each of the keywords is attached and displaying the keywords according to their frequencies. Based on this information, a user can obtain some hint in the viewpoint of what property the narrowed set of documents has.

Next, a user specifies a document of interest among a set of documents. The user could also specify a plurality of documents interest. In response to this, the system displays keywords capable of retrieving other documents, other than the document(s) specified by a user, among the keywords attached to the specified document(s). This is carried out by determining elements in the set of keywords attached to the specified document(s) from among the set of keywords attached to the set of narrowed documents. However, at this time, keywords are omitted that meet the following conditions:

(1) the keyword is not attached to any documents other than the specified one; and
(2) the keyword is attached to all the documents in the current set of documents.

The system displays the keywords determined thus according to their frequencies. This information enables a user to find what keyword should be specified to obtain a document similar to the specified document. Next, a user can obtain a set of more interesting documents by using such a keyword for further narrowing.

BRIEF DESCRIPTION OF THE DRAWING

For a more complete understanding of this invention, reference is now made to the following detailed description of the embodiments as illustrate in the accompanying drawing, wherein.

DETAILED DESCRIPTION OF THE PREFERRED EMBODIMENT

Hardware and Software Configuration

Figure 1:
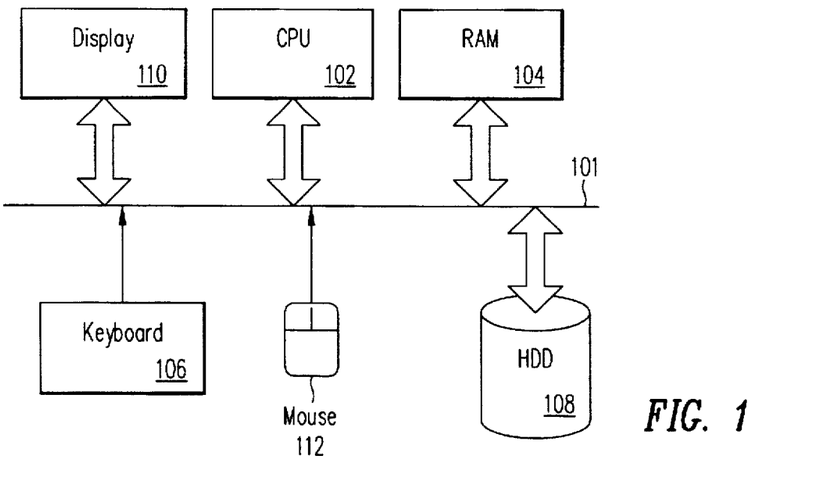
FIG. 1 is a block diagram of the hardware configuration of the present invention.

FIG. 1 is a general schema of the system configuration for implementing the present invention. This is an ordinary configuration wherein connected to a bus 101 are the following: a central processing unit (CPU) 102 having a function to control arithmetic operations and input/output; a main memory (RAM) 104 for loading a program and giving a work space for the CPU 102; a keyboard 106 for key inputting commands or character strings; a hard disk 108 in which an operating system for controlling the CPU 102, a database file, a retrieval engine, index file, and the like are stored; a display device 110 for displaying the retrieved results of a database; and a mouse 112 for pointing any position on the screen of the display device 110 and conveying the positional information to the CPU.

An operating system is desirous which supports a standard GUI multi-window environment such as Windows (trademark of Microsoft), OS/2 (trademark of IBM), X-WINDOW system (trademark of MIT) on AIX (trademark of IBM) operating system, but the present invention is also implementable even in a character base environment such as PC-DOS and MS-DOS (trademark of Microsoft) and is not limited to a definite operating system environment.

FIG. 1 shows a system in a stand-alone environment but, since generally a data file requires a large capacity disk device, it is allowable to implement the present invention as a client/server system, to dispose a database file and a retrieval engine at a server machine, to LAN connect a client machine to the server machine through Ethernet, token ring, or the like, and dispose only a display control section for viewing the retrieved results on the client machine side.

System Configuration

Next, referring to the block diagram of FIG. 2, the system configuration of the present invention will be described. Incidentally, it should be noted that the elements indicated with individual blocks are stored in the hard disk 108 of FIG. 1 individually or collectively as data files.

Figure 2:
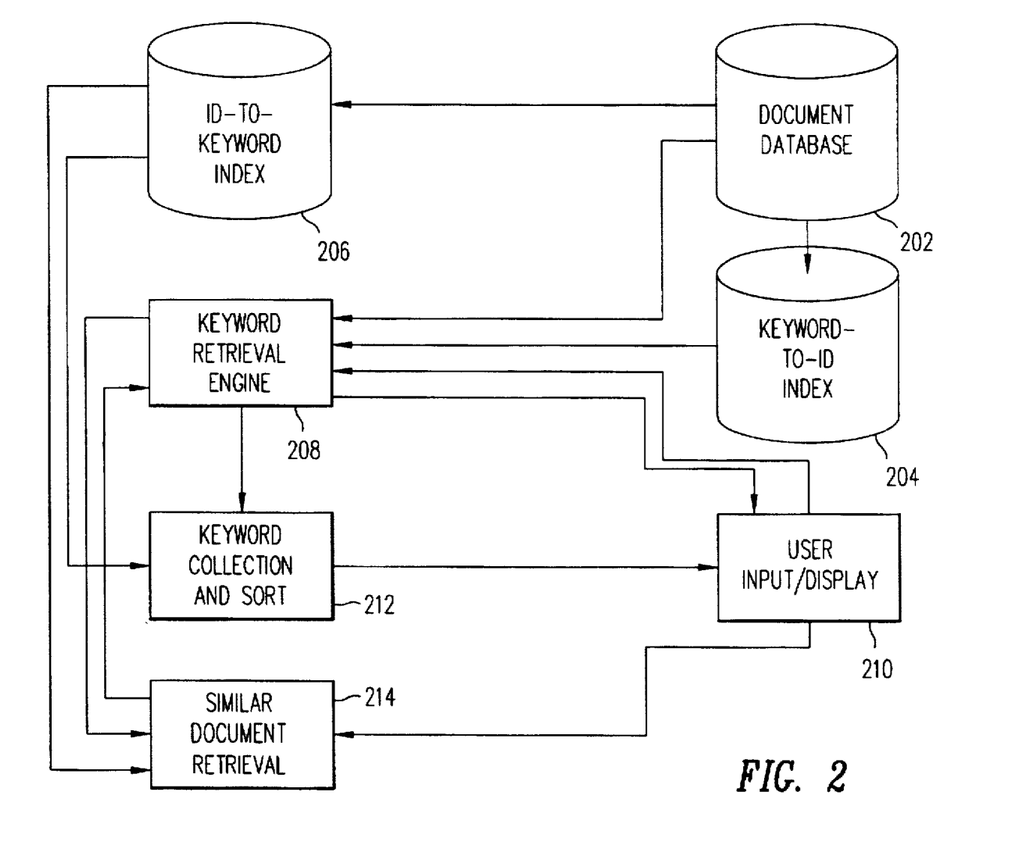
FIG. 2 is a block diagram of the system configuration of the present invention.

In FIG. 2, a document database contains a plurality of documents, newspaper articles and patent publications, and unique IDs are preferably related to individual documents. For keywords extracted from individual documents in the document database 202, the keyword-to-ID index 204 is a file for storing the IDs for one or more documents containing each of them with IDs related to the relevant keyword. For the respective ID for each document in the document database 202, the ID-to-keyword index 206 is a file to store one or more keywords extracted from the document corresponding to the ID while keeping the correspondence relation.

Based on a retrieval expression formed of a single keyword or plural keywords combined by logic symbols, the keyword retrieval engine 208 retrieves the keyword-to-ID index 204, accesses the contents of the document database 202 with the ID for the relevant document, and returns the title or the contents of the relevant document.

The user input/display module 210 gives a keyword to be retrieved or other commands to the keyword retrieval engine 208 and displays the title or contents of a document returned from the keyword retrieval engine 208.

The keyword collection & sort module 212 performs a function to collect data on keywords contained in the documents retrieved by the keyword retrieval engine 208 and the number of documents containing individual keywords, to sort them in order of decreasing number of documents, to provide the data to the user input/display module 210, and to display them onto the display 110.

In response to the selection of more than one document from the list of documents retrieved by the keyword retrieval engine 208 and displayed on the display 110, the similar document retrieval module 214 omits, among keywords extracted from the selected documents, a keyword that meets either of the following conditions:

(1) the keyword is not attached to any document other than the selected one; and
(2) the keyword is attached to all the documents in the current set of documents, and retrieves documents by using the highest frequency one in the rest of the keywords as a retrieval keyword.

Document Retrieval Processing

Figure 3:
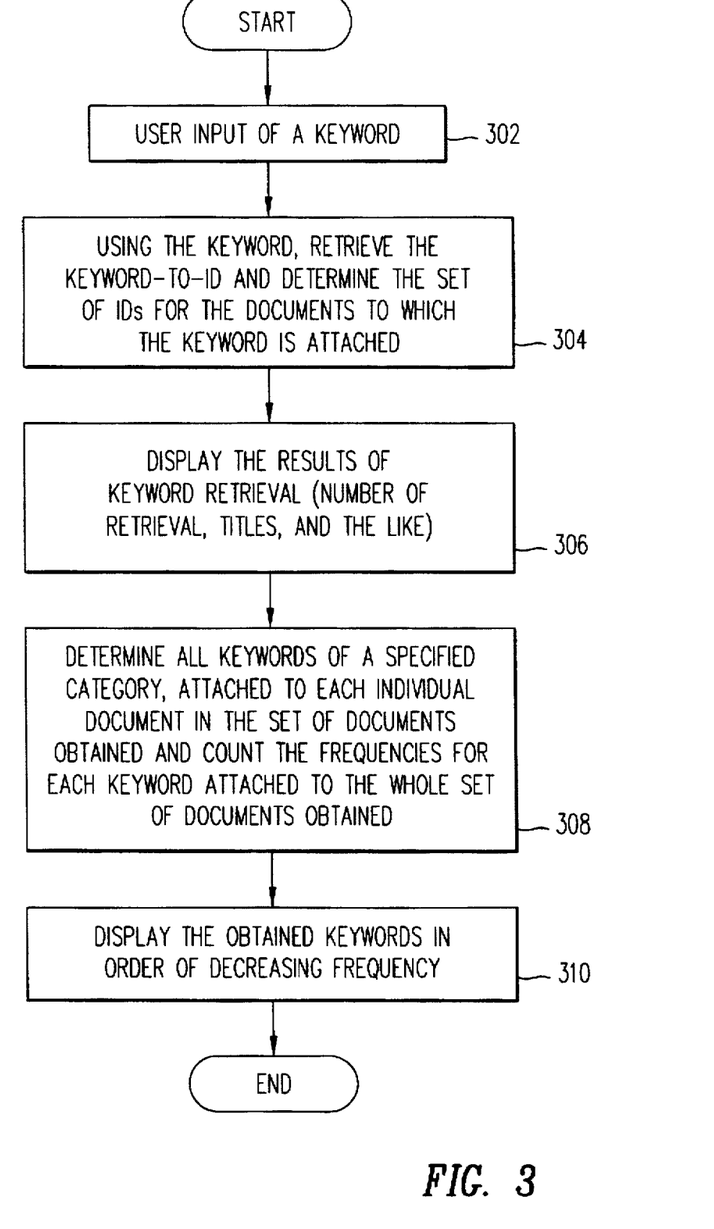
FIG. 3 is a flowchart of the processing in the first embodiment of the present invention.

FIG. 3 is the processing flow in the system according to a first embodiment of the present invention.

At Step 302 of FIG. 3, first, the user input of a keyword is performed using the user input/display module 210 of FIG. 2 and keyboard 106. This keyword may be a single keyword or may be a retrieval expression of keywords linked by AND or OR.

At Step 304, the keyword or retrieval expression inputted thus is delivered to the keyword retrieval engine 208, by use of which the keyword retrieval engine 208 retrieves the keyword-to-ID index 204 and returns a set of IDs for documents corresponding to the keyword or retrieval expression.

At Step 306, based on a set of documents obtained at Step 304, the results of keyword retrieval (number of retrievals, title, or the like) are determined preferably on individual and separate windows in display 110 by the user input/display module 210.

At Step 308, all keywords of a specified category, attached to individual documents in the obtained set of documents, are determined and the frequencies for each keyword attached to a set of documents obtained at Step 306 are counted.

Incidentally, if no keyword is previously attached to each individual document, the system may be arranged to automatically extract keywords from a set of documents narrowed after retrieval.

At Step 310, keywords obtained at Step 308 are sorted preferably in order of decreasing count value by using the module 212 and displayed on individual and separate windows in display 110 by the user input/display module 210 also.

By viewing the list of keywords sorted thus in order of descending frequency, a user can become aware of what property is possessed by a set of documents narrowed at Step 306, and can further narrow the set of documents narrowed at Step 306 by using keywords listed.

Furthermore, by using the head keyword in the list of keywords sorted in order of decreasing frequency, the system may be arranged to automatically narrow the current set of documents.

Figure 4:
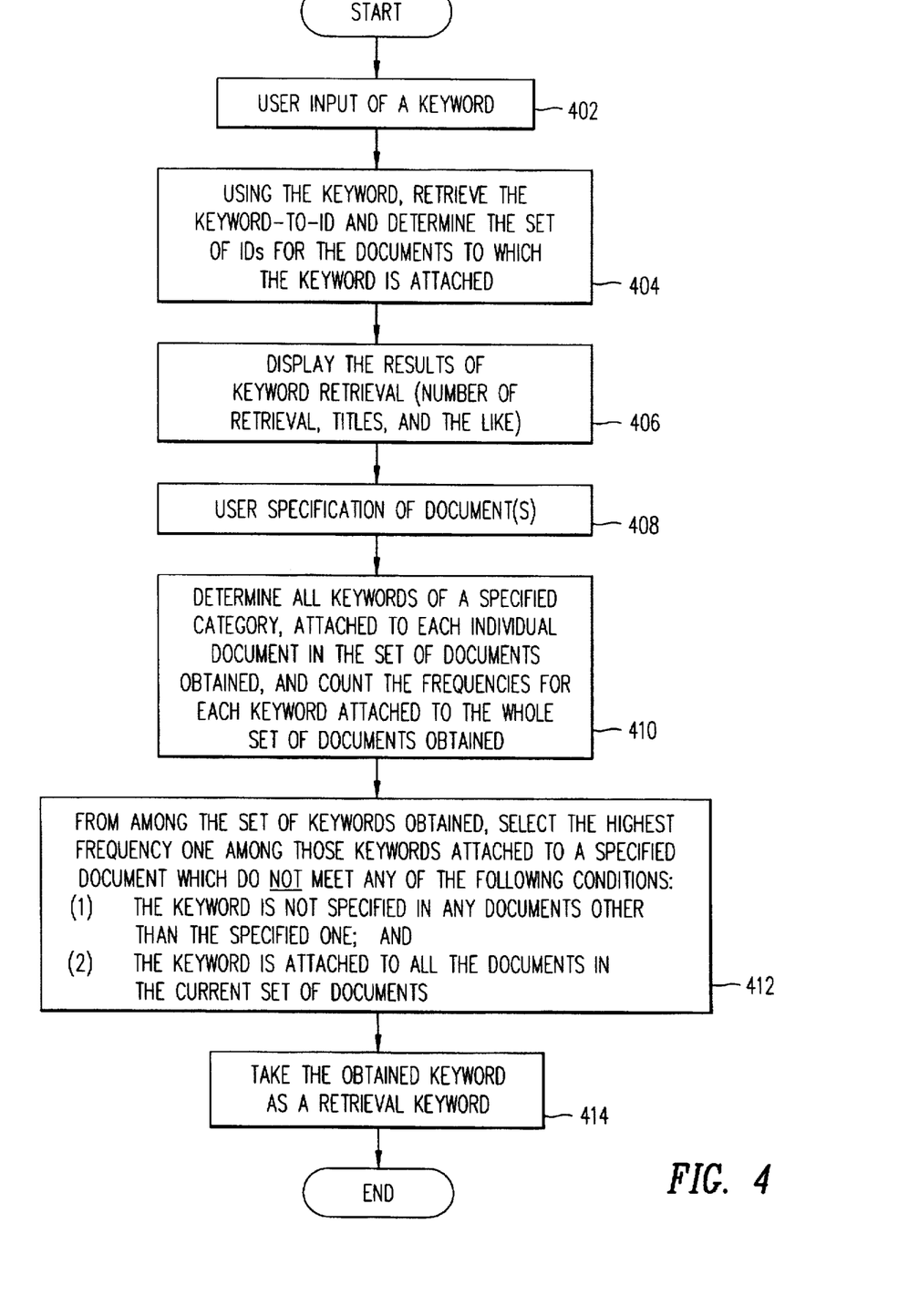
FIG. 4 is a flowchart of the processing in the second embodiment of the present invention.

Referring to FIG. 4, the flow of a second embodiment of the present invention is described.

At Step 402 of FIG. 4, first, a user's keyword input is performed with the user input/display module 210 and keyboard 106. Herein also, this keyword may be a single keyword or may be a retrieval expression of keywords linked by AND or OR.

At Step 404, a keyword or retrieval expression inputted thus is delivered to the keyword retrieval engine 208, thereby the keyword retrieval engine 208 retrieves the keyword-to-ID index 204 and returns a set of IDs for documents corresponding to the keyword or retrieval expression.

Incidentally, if no keyword is previously attached to each individual document, it may be so arranged as to automatically extract keywords from individual documents in a set of documents narrowed after retrieval.

At Step 408, based on a set of IDs for documents obtained at the Step 404, the results of keyword retrieval (number of retrievals, titles, and the like) are displayed preferably on a separate windows in the display 110.

At Step 408, by viewing titles of the list resultant from a retrieval displayed on a separate windows as a result of Step 406, a user selects one or plural documents that seem to be interesting. This is executable, for example, by clicking the displayed row of the relevant title with the mouse 112. The clicked row of title display is displayed in an inverse video and is understood to be selected.

At Step 410, all keywords of a specified category, attached to individual documents in the obtained set of documents, are determined and the frequencies for each keyword attached to a set of documents are obtained and the frequencies for each keyword attached to a set of documents obtained at Step 404 are counted.

At Step 412, from a set of documents obtained at Step 404 by using the similar document retrieval module 214, the system selects a keyword having the highest frequency among those keywords attached to a specified document which do NOT meet any of the following conditions:

(1) the keyword is not specified in any documents other than the specified one; and
(2) the keyword is attached to all the documents in the current set of documents.

At Step 414, the system retrieves the current set of documents with the obtained keyword taken as a retrieval keyword.

Incidentally, at Step 414, instead of retrieving the current set of documents with the obtained keyword taken as a retrieval keyword, the system may list the keywords meeting the conditions (1) and (2) mentioned above along with their frequencies, preferably in order of decreasing frequency, thereby allowing a user to select his/her desired keyword.

Example of Navigation Processing

Hereinafter, an example of performing a retrieval and navigation by using the system according to the embodiments mentioned above in a database in which newspaper articles for a definite period are collected will be described:

First, as a result of retrieval concerning the keyword "accident", the number of hits was 109. In response to this retrieval processing, a window entitled "Article subcategory display" is opened in accordance with the processing shown in the flowchart of FIG. 3, displaying the list of keywords contained in the retrieved documents that are arranged in order of decreasing frequency.

TABLE 1

| | |
|---|---|
| Neutram | 32 |
| Cause | 29 |
| Runaway | 27 |
| Runaway accident | 27 |
| System | 23 |
| Death | 22 |
| Traffic system | 21 |
| Resume | 20 |
| Accident causation | 17 |
| Safety | 16 |
| Running resumption | 16 |
| ... | |

Also, at the same time, dates and titles of the 109 articles retrieved are displayed in another window as follows:

TABLE 2

| | |
|---|---|
| 931101 | Since the accident of Chernobyl atomic power station, the real status of old soviet made atomic reactors has been gradually |
| 931101 | Possible cause of runaway accident, faulty in new tram relay |
| 931101 | New tram runaway accident, faulty in a relay device, relay in the 3rd car |
| 931101 | TOMEI Speedway, trucks and buses totally burnt-fire arising from loaded paints or the like |
| 931102 | Burn due to pans ceaseless-caution against grips |

On selection of an article, entitled "Since the accident of Chernobyl atomic power station . . . ", on this window indicating dates and titles, for example, by user clicking a title with the mouse, the relevant row is displayed in inverse video. At this time, selection of plural articles is also possible by a similar operation.

A similar document selection can be manipulated by clicking the button entitled "Similar document" on the screen. The system selects articles by the processing shown in the flowchart of FIG. 4, including the highest frequency keyword of those which do NOT meeting any of the following conditions:

(1) the keyword is not specified in any articles other than the specified one; and
(2) the keyword is attached to all the articles in the current set of articles retrieved.

In this example, such a keyword is "Safety", and the system automatically performed a retrieval concerning the keyword of "Safety" in the current set of retrieved articles and obtained 16 hits of articles therefrom.

By viewing the titles or contents of these 16 articles, a user came to be navigated to articles related to the title "Since the accident of Chernobyl atomic power station . . . " and thereby could deepen the understanding of his/her interesting articles.

As described above, the present invention enables a user to take a look at the property of the set of documents narrowed from the list of keywords automatically created by the system and view related documents in sequence without a definite previous knowledge by being automatically navigated to other documents related to the document selected by the user. In other words, the present invention allows for search by document rather than by keyword.

What is claimed is:

1. An information retrieval method for navigating users by computer processing in a database containing keyword-attachable information and comprising a plurality of individually identifiable data elements, said method comprising the steps of:

(a) in a given set of said data elements, for each given keyword attached to said set of said data elements, counting a corresponding number of said data elements to which the keyword is attached as a frequency for the keyword; and (b) sorting said keywords in a decreasing order of said frequency and displaying a list of said sorted keywords and the corresponding number of data elements for each sorted keyword.

2. The information retrieval method as set forth in claim 1, wherein said given set of said data elements are obtained by a user's keyword retrieval processing.

3. An information retrieval method for navigating users by computer processing in a database containing keyword-attachable information and comprising a plurality of individually identifiable data elements, said method comprising the steps of:

(a) in a given set of said data elements, extracting the keyword-attachable information from said data elements;

(b) with respect to the keywords extracted from said data elements, in said given set of said data elements, for each given keyword attached to said set of said data elements, counting a corresponding number of said data elements to which the keyword is attached as a frequency for the keyword; and (c) sorting said keywords in a decreasing order of said frequency and displaying a list of said sorted keywords and the corresponding number of data elements for each sorted keyword.

4. The information retrieval method as set forth in claim 3, wherein said given set of said data elements are obtained by a user's keyword retrieval processing.

5. An information retrieval method for navigating users by computer processing in a database containing keyword-attachable information and comprising a plurality of individually identifiable data elements, said method comprising the steps of:

(a) in a given set of said data elements, for each given keyword attached to said set of said data elements, counting a corresponding number of said data elements to which the keyword is attached as a frequency for the keyword; and (b) searching for a second set of said data elements by using the keyword having the highest count value among said keywords.

6. The information retrieval method as set forth in claim 5, wherein said given set of said data elements are obtained by a user's keyword retrieval processing.

7. An information retrieval method for navigating users by computer processing in a database containing keyword-attachable information and comprising a plurality of individually identifiable data elements, said method comprising the steps of:

(a) in a given set of said data elements, extracting keywords from said data elements;

(b) with respect to the keywords extracted form said data elements, in said given set of said data elements, for each given keyword attached to said set of said data elements, counting a corresponding number of said data elements to which the keyword is attached as a frequency for the keyword; and (c) searching for a second set of said data elements by the keyword having the highest count value among said keywords.

8. The information retrieval method as set forth in claim 7, wherein said given set of said data elements are obtained by a user's keyword retrieval processing.

9. An information retrieval method for navigating users by computer processing in a database containing keyword-attachable information and comprising a plurality of individually identifiable data elements, said method comprising the steps of:

(a) displaying a list identifying a given set of said data elements;

(b) in said given set of said data elements, for each given keyword attached to said set of said data elements, counting a corresponding number of said data elements to which the keyword is attached as a frequency for the keyword; and (c) in response to a user selection of at least one data element out of said given set of data elements, selecting a keyword having a highest frequency among those which do NOT meet any of the following conditions:

(1) the keyword is not attached to any data element other than the selected one; and (2) the keyword is attached to all the data elements documents in said given set of data elements; and (d) searching for a second set of said data elements by using the keyword obtained at said Step (c).

10. The information retrieval method as set forth in claim 9, wherein said given set of said data elements are obtained by a user's keyword retrieval processing.

11. An information retrieval method for navigating users by computer processing in a database containing keyword-attachable information and comprising a plurality of individually identifiable data elements, said method comprising the steps of:

(a) displaying a list identifying a given set of said data elements;

(b) in said given set of said data elements, extracting keywords from each of said data elements;

(c) in said given set of said data elements, for each given keyword attached to said set of said data elements, counting a corresponding number of said data elements to which the keyword is attached as a frequency for the keyword;

(d) in response to a user selection of at least one data element out of said given set of data elements, selecting a keyword having the highest frequency among those which do not meet any of the following conditions:

(1) the keyword is not attached to any data element other than the selected one; and (2) the keyword is attached to all of the data elements in the given set of data elements; and (e) searching for a second set of said data elements by using the keyword obtained at said Step (c).

12. The information retrieval method as set forth in claim 11, wherein said given set of said data elements are obtained by a user's keyword retrieval processing.

13. An information retrieval method for navigating users by computer processing in a database containing keyword-attachable information and comprising a plurality of individually identifiable data elements, said method comprising the steps of:

(a) displaying a list identifying a given set of said data elements;

(b) in said given set of said data elements, for each given keyword attached to said set of said data elements, counting a corresponding number of said data elements to which the keyword is attached as a frequency for the keyword; and (c) in response to a user selection of at least one data element out of said given data elements, listing keywords along with said frequency which do NOT meet any of the following conditions:

(1) the keyword is not attached to any documents other than the selected one; and (2) the keyword is attached to all the documents in the given set of documents.

14. The information retrieval method as set forth in claim 13, wherein said given set of said data elements are obtained by a user's keyword retrieval processing.

15. An information retrieval system for navigating users by computer processing in a database containing keyword-attachable information and comprising a plurality of individually identifiable data elements, said system comprising:

(a) for a given set of said data elements, for each given keyword attached to said set of said data elements, means for counting a corresponding number of said data elements to which the keyword is attached as a frequency for the keyword; and (b) means for sorting said keywords in a decreasing order of said frequency and displaying a list of said sorted keywords and the corresponding number of data elements for each sorted keyword.

16. The information retrieval system as set forth in claim 15 further comprising means for obtaining said given set of said data elements by keyword retrieval processing.

17. An information retrieval system for navigating users by computer processing in a database containing keyword-attachable information and comprising a plurality of individually identifiable data elements, said system comprising:

(a) means for displaying a list identifying a given set of said data elements;

(b) for each given keyword attached to said set of said data elements, means for counting a corresponding number of said data elements to which the keyword is attached as a frequency for the keyword;

(c) means, responsive to a user selection of at least one data element out of said given data elements, for selecting a keyword having a highest frequency among those which do NOT meet any of the following conditions:

(1) the keyword is not attached to any documents other than the selected one; and (2) the keyword is attached to all the documents in the given set of documents; and (d) means for searching for a second set of said data elements by using the keyword obtained at said Step (c).

18. The information retrieval system as set forth in claim 17 further comprising means for obtaining said given set of said data elements by keyword retrieval processing.

19. An information retrieval system comprising:

means for retrieving, in response to a retrieval request, a first set of data elements having a set of associated keywords for each data element;

for each given keyword attached to the first set of data elements, means for counting a corresponding number of the data elements to which the keyword is attached as a frequency for the keyword;

means for displaying a list of the keywords, and the frequency for each keyword, associated with the first set of data elements; and means for retrieving a second set of data elements based upon a selection of at least one selected keyword from the list.

20. An information retrieval system comprising:

means for retrieving, in response to a retrieval request, a first set of data elements having a set of associated keywords for each data element;

for each given keyword attached to the first set of data elements, means for counting a corresponding number of the data elements to which the keyword is attached as a frequency for the keyword;

means for displaying a list of the keywords, and the frequency for each keyword, associated with the first set of data elements; and means for retrieving a second set of data elements based upon a high frequency keyword having a highest frequency among the keywords in the list.

21. An information retrieval system comprising:

means for retrieving, in response to a retrieval request, a first set of data elements having a set of associated keywords for each data element;

means for receiving, from a user, a selection of at least one data element from the first set; and for each given keyword attached to the selected at least one data element, means for counting a corresponding number of the data elements to which the keyword is attached as a frequency for the keyword;

means for retrieving a second set of data elements based upon the set of keywords associated with the selected at least one data element.

22. The system of claim 21 wherein the means for retrieving the second set of data elements uses the keyword with a highest keyword frequency.

23. The system of claim 21 wherein the user selects at least one retrieval keyword from the set of keywords associated with the selected at least one data element in retrieving the second set of data elements.

24. The information retrieval system of claim 21 wherein the keyword frequency is determined by omitting any keywords associated with the selected at least one data element if (a) the keyword is not attached to any data element other than the one selected; or (b) the keyword is associated to all of the data elements in the first set of data elements.

25. An information retrieval method comprising:

retrieving, in response to a retrieval request, a first set of data elements having a set of associated keywords for each data element;

for each given keyword attached to the first set of data elements, counting a corresponding number of the data elements to which the keyword is attached as a frequency for the keyword;

displaying a list of the keywords, and the frequency for each keyword, associated with the first set of data elements; and retrieving a second set of data elements based upon a selection of at least one selected keyword from the list.

26. An information retrieval method comprising:

retrieving, in response to a retrieval request, a first set of data elements having a set of associated keywords for each data element;

receiving, from a user, a selection of at least one data element from the first set;

for each given keyword attached to the selected at least one data element, counting a corresponding number of the data elements to which the keyword is attached as a frequency for the keyword;

retrieving a second set of data elements based upon the set of keywords associated with the selected at least one data element.

27. An information retrieval method comprising:

retrieving, in response to a retrieval request, a first set of data elements having a set of keywords associated with each data element;

for each given keyword attached to said first set of data elements, counting a corresponding number of said data elements to which the keyword is attached as a frequency for the keyword;

displaying the set of keywords associated with the first set of data elements and the corresponding number of data elements for each keyword;

receiving a selection of a subset of the set of keywords; and retrieving, in response to the subset of the set of keywords selected, a second set of data elements.

28. The method of claim 27 wherein the set of keywords are displayed in order of the frequency of each keyword.

29. The method of claim 27 wherein the selection of the subset of the set of keywords received is specified as at least one data element.

30. The method of claim 27 wherein the selection of the subset of the set of keywords received is specified as at least one keyword.

31. An information retrieval method comprising:

retrieving, in response to a retrieval request, a set of data elements having a set of properties associated with each data element;

displaying the properties in an order dependent upon a number of data elements with which each property is associated;

receiving at least one selected data element of interest selected by a user; and retrieving a second set of data elements in response to the properties associated with the at least one selected data element of interest.

32. An information retrieval method comprising:

retrieving, in response to a retrieval request, a set of data elements having a set of keywords associated with each data element;

displaying the keywords in an order dependent upon a number of data elements with which each keyword is associated;

receiving at least one selected data element of interest selected by a user; and retrieving a second set of data elements in response to the keywords associated with the at least one selected data element of interest.

33. The method of claim 32 wherein the second set of data elements is retrieved by omitting keywords meeting the following conditions:

(1) the keyword is not associated with any data element other than the at least one selected data element; and (2) the keyword is associated with all of the data elements in the set of data elements.

34. An information retrieval system comprising:

means for retrieving, in response to a retrieval request, a set of data elements having a set of properties associated with each data element;

means for displaying the properties in an order dependent upon a number of data elements with which each property is associated;

means for receiving at least one selected data element of interest selected by a user; and means for retrieving a second set of data elements in response to the properties associated with the at least one selected data element of interest.

35. An information retrieval system comprising:

means for retrieving, in response to a retrieval request, a set of documents having a set of keywords associated with each data element;

means for displaying the keywords in an order dependent upon a number of documents with which each keyword is associated;

means for receiving a selection of at least one selected document of interest selected by a user; and means for displaying a second set of keywords, associated with the at least one selected document, capable of retrieving a second set of documents other than the at least one selected document.

36. The system of claim 35 further comprising:

means for retrieving the second set of documents in response to a selection of keywords from the displayed second set of keywords.

37. The system of claim 36 further comprising:

means for displaying a third set of keywords associated with the second set of documents;

means for receiving a second selection of at least one selected document from the second set of documents; and means for displaying a third set of keywords, associated with the second selection, capable of retrieving a third set of documents other than the second selection of at least one document.

* * * * *